United States Patent [19]

Luiz

[11] 4,191,997
[45] Mar. 4, 1980

[54] CIRCUITS AND METHODS FOR MULTIPLE CONTROL IN DATA PROCESSING SYSTEMS

[75] Inventor: Fernando A. Luiz, Monte Sereno, Calif.

[73] Assignee: International Business Machines Corporation, Armonk, N.Y.

[21] Appl. No.: 894,738

[22] Filed: Apr. 10, 1978

[51] Int. Cl.² .............................................. G06F 3/04
[52] U.S. Cl. .................................................. 364/200
[58] Field of Search ... 364/200 MS File, 900 MS File

[56] References Cited

U.S. PATENT DOCUMENTS

| 3,336,582 | 8/1967  | Beausoleil et al. | 364/200 |
| 3,840,859 | 10/1974 | Vigil et al.      | 364/200 |
| 4,079,448 | 3/1978  | N'Guyen et al.    | 364/200 |

Primary Examiner—Mark E. Nusbaum
Assistant Examiner—Thomas M. Heckler
Attorney, Agent, or Firm—R. Bruce Brodie

[57] ABSTRACT

In a data processing system in which two or more asynchronous processors operating as masters interchange requests and responses with a control unit that in turn controls a number of peripheral devices and operates as a slave to the processors, repetitive requests from a high speed processor can give rise to an impasse condition in which the control unit is blocked from completing the previously initiated sequence between a peripheral device and another processor. In accordance with the invention, the interface between the processors and the peripheral devices incorporates means which detect an uninterrupted sequence, of predetermined length, of busy responses from the control unit. If such responses are not interrupted by other actions, the system temporarily exercises independent control, returning a busy signal to the processors while enabling the control unit to ascertain whether reconnection to a specific processor is needed as the next step in a previously initiated processor program. if so, the control unit is enabled within the predetermined interval to effect the reconnection, either within the allotted time or on a succeeding repetition of the cycle. The exercise of a limited initiative for a predetermined time interval does not alter the basic master-slave relationship or unduly delay data transfer operations.

12 Claims, 2 Drawing Figures

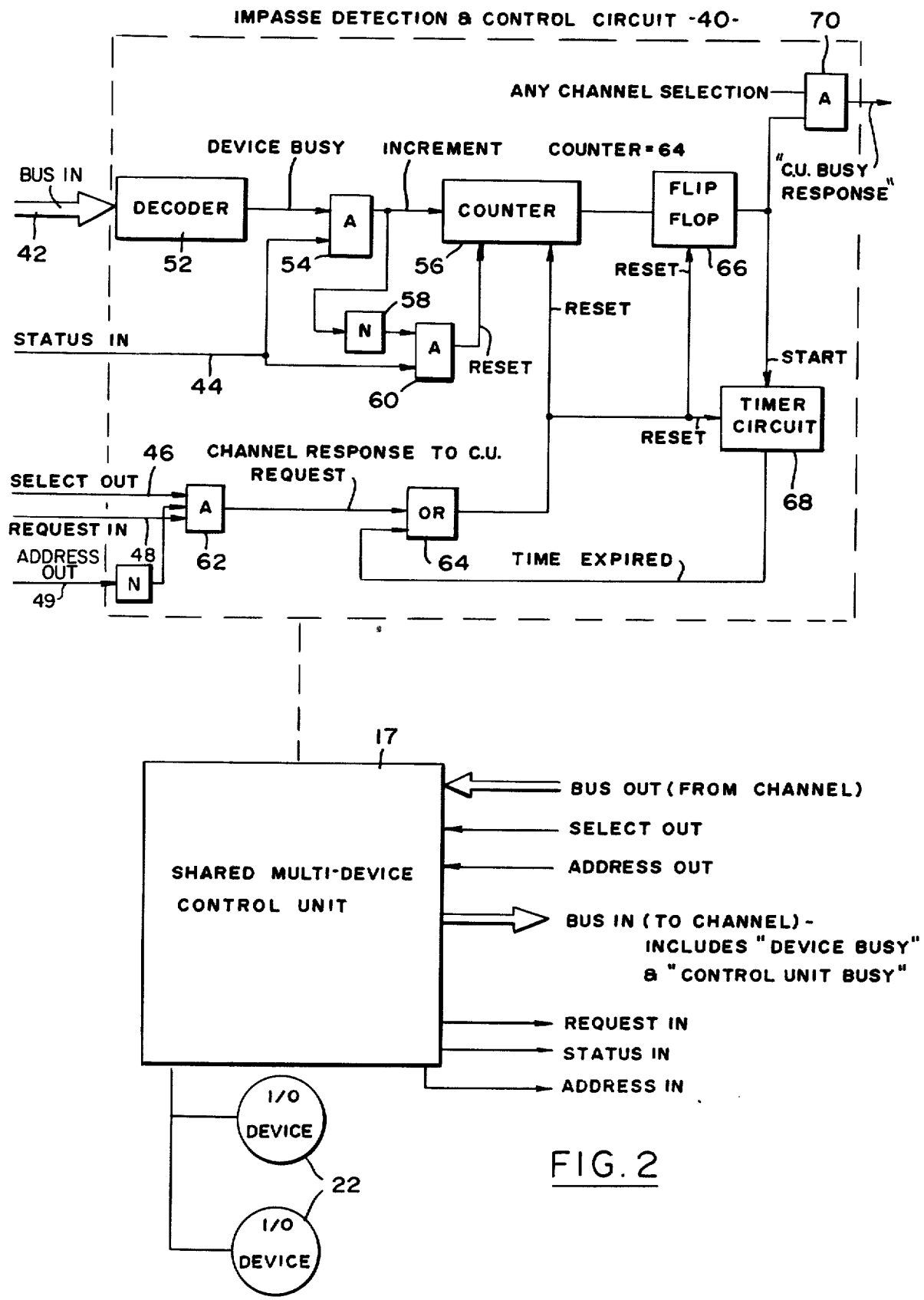

CIRCUITS AND METHODS FOR MULTIPLE CONTROL IN DATA PROCESSING SYSTEMS

BACKGROUND OF THE INVENTION

Complex modern data processing systems now often use two or more processors together with a large number of peripheral or I/O devices which are accessible from one or more of the processors through control units or interfaces. Modern system organization increasingly uses hierarchal structures in which two or more central processors (CPUs) transfer data to and from a plurality of I/O devices through control units (CUs) having specific capabilities. Characteristically, the CU monitors the states of the I/O devices while also interchanging acknowledgement sequences with both the CPUs and the I/O devices, and further enables a CPU to acquire control of, and transfer data with, a given I/O device. In this type of arrangement, the CU performs not only multiplexing functions but also carries out internal monitoring sequences so as to provide the CPU with current indications as to the availability of the I/O devices and their status when performing given tasks.

Usually, the CPUs function in a master-slave relationship with the CUs, in that the CUs are held subservient to commands and requests, and required to respond when queried. Although the control unit may seek to complete a scan of the coupled I/O devices, and to undertake internal signal sequencing so as to complete various functions, it cannot independently delay responses to requests for status from the CPUs. Thus when a control unit is required to respond to two asynchronous CPUs, it may do so on a priority basis but must interrupt its current activity in order to effect the response, then go back to the appropriate cycle point. However, the control unit may be coupled to processors having significantly differing data rates, such as a large central processor which cooperates with and also operates independently of a smaller satellite processor, with both seeking access to the same I/O devices. The higher speed processor establishes a queue of initiatives which it may seek to undertake, and may go through this queue very rapidly and return with a given status request to a particular control unit which is seeking to undertake other action. If the control unit, for example, is seeking to reconnect to the slower speed processor, then it must ascertain that a given I/O device has completed a previously assigned task and is available for the next step in the processor program, and then an attempt must be made to gain reconnection attention to the slower speed processor. However, before the reconnection can be established the higher speed processor may initiate a status request, requiring a response before the control unit sequence has been completed. When the I/O device to which the higher speed processor is seeking access is the same one that was previously connected with the slower speed processor, and for which the reconnection must be established, repeated requests for status by the higher speed processor will only derive the indication that the particular device is busy, thus establishing the impasse condition. It is not desirable to redesign control units so as to operate with sufficient independence to assure that the impasse cannot arise because this would adversely affect the hierarchy of control. It is also not desirable to impose added software requirements on the central processor systems.

SUMMARY OF THE INVENTION

Circuits and methods in accordance with the invention monitor the status of the responses from a control unit itself, and in the event that an excessive number of uninterrupted busy responses is provided, initiate a timed but limited interval in which a superseding busy indication is provided to one or more processors or processor channels, to enable the control unit to complete internal sequencing and to effect reconnection to a given processor so as to complete a previously initiated action. In a specific example of a circuit in accordance with the invention, a shared multi-device control unit which is coupled to two or more I/O devices, as well as to at least two different processors, provides device busy signals in response to requests from a processor channel, when the device is occupied with completion of a prior command. Device busy signals are detected and utilized to increment a counter which provides an output signal as a predetermined count. However, failure to provide a device busy signal in response to a status request or the generation of a different type of response resets the counter to reinitiate the sequence. When the predetermined count is reached, a timer circuit having a preset time interval is started, and during the timed interval a control unit busy response is sent to one or more processor channels, enabling the control unit to search the internal tasks it has to perform, and to attempt to effect reconnection to a given processor for completion of a task previously assigned to an I/O device. In the event that the reconnection cannot be made within the specific interval, the timer resets the counter and the impasse condition is again detected to restart the cycle for another reconnection attempt. In this way, the impasse condition is disrupted and can be corrected, without modifying the basic relationship between the processors and the peripheral units, or between the processors and the control unit.

BRIEF DESCRIPTION OF THE DRAWINGS

A better understanding of the invention may be had by reference to the following description, taken in conjunction with the accompanying drawings, in which:

FIG. 2 is a block diagram of circuits in accordance with the invention employing a shared multi-device control unit and an impasse detection and control circuit.

DETAILED DESCRIPTION OF THE INVENTION

Figure 1:
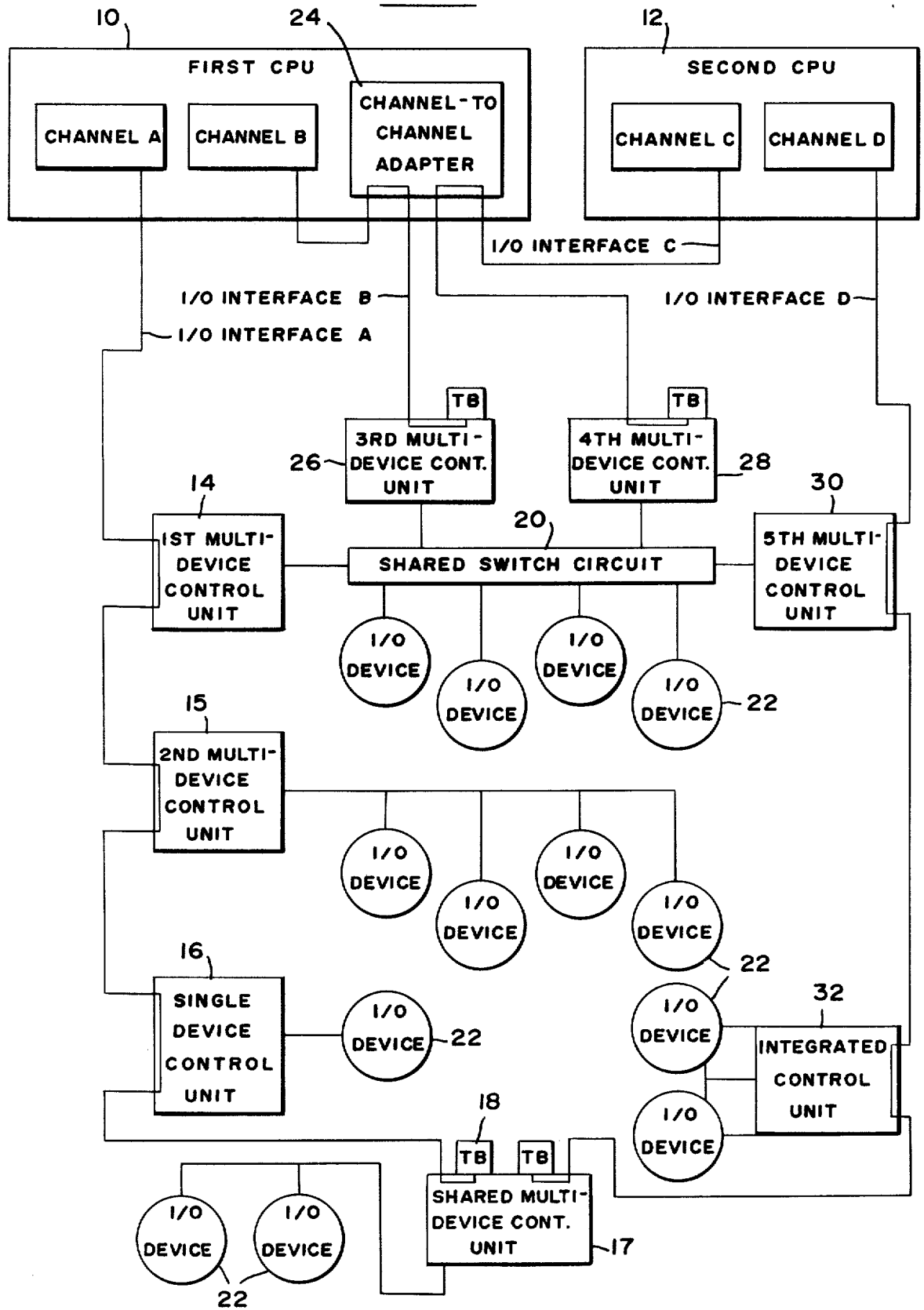
FIG. 1 is a block diagram of a processor system useful in defining the context of control circuits and methods in accordance with the invention.

The context of a typical system in accordance with the invention may be established by reference to the block diagram of FIG. 1, in which one example of a widely used system configuration is employed. In this system, a first central data processing unit 10 (hereinafter referred to as the first CPU) and a second CPU 12 are arranged to cooperate with each other as well as a substantial number of peripheral devices, here referred to as I/O devices. The arrangement is illustrative of the type of system in which a high speed central processor 10 and one or a number of lower speed processors 12 are integrated for the performance of a variety of tasks, using different combinations of peripheral devices. Although those skilled in the art will recognize the variety of combinations and alternatives available, the system of FIG. 1 is intended to exemplify some of the versatility which can be achieved. Each of the CPUs 10, 12, has different channels, two each in this example, that are connected with other units in different ways. Channel A in the first CPU 10 is coupled in serial fashion to first and second multi-device device control units 14, 15, then to a single device control unit 16, and then to a shared device control unit 17, at which the line is ended at a terminator block (TB) 18. The first multi-device control unit 14 is coupled, via a shared switch circuit 20 to each of a set of I/O devices 22. The second multi-device control unit 15 alone controls a set of different I/O devices 22, while the single device control unit 16 is, as its name indicates, used to control only an individual I/O device. These arrangements are only illustrative of the general scheme of system organization, and need not be further discussed. The shared multi-device control unit 17, however, encounters special problems and these as described below give rise to the need for circuits in accordance with the present invention.

Channel B in the first CPU 10 is utilized in different ways via a channel-to-channel adapter 24, one interface channel from which is coupled to a third multi-device control unit 26 that also couples into the shared switch circuit 20. Another channel from the adapter 24 couples both to channel C in the second CPU 12, and to a fourth multi-device control unit 28. The last channel, D, couples serially to a fifth multi-device control unit 30, an integrated control unit 32 and the shared multi-device control unit 17. At the integrated control unit 32, a pair of I/O devices 22 may be used in such fashion as to communicate with channel D or to effect transfers between them. The shared multi-device control unit 17, in this example, controls a pair of I/O devices 22, although a substantially greater number are generally utilized. In the system of FIG. 1, the first CPU 10 and the second CPU 12 operate as masters relative to the various control units which function as slaves. In this hierarchy, the various control units are required to respond when interrogated by the CPUs, which recognizes the fact that the CPUs have higher levels of computing and control capability and cannot therefore be subject to independent initiatives from the control units.

Those skilled in the art will recognize a number of factors which need be discussed only briefly here. Modern control units, whether multi-device control units, single device control units, integrated control units or shared multi-device control units, typically have substantial decisional capability. If, for example, the actuator arm on an addressed disk file is to be moved from one position to another, a substantial time (in milliseconds) is required for the action. The control unit first interfaces with the channel which requests that particular disk file, to respond with an indication as to the availability of the device, and then to initiate the desired action in response to a command from the associated CPU. Once the peripheral device has been properly instructed to undertake the required action, the control unit can perform other functions until such time as the action has been completed, in this instance when the arm has reached the desired track position. During this interval there is no electrical connection to the peripheral device, but the control unit maintains a logical connection by retaining the function of advising the CPU when the programmed step has been completed. At such time, the control unit attempts to reconnect to the appropriate processor channel, so as to indicate that the peripheral device is awaiting the next succeeding step, whether the transfer of data or the provision of a further command. By this means, the high data rate capabilities in the CPUs are most effectively utilized, in that they are not required to perform the intermediate control and monitoring functions or to become involved in extensive "handshaking" procedures with the individual peripheral devices.

It will further be appreciated that the interface interconnections A, B, C and D are not individual lines, but parallel line groupings on which data, special indicators, addresses and commands may be communicated. A specific discussion of such factors as data buses, tag lines, address, selection and command functions is provided in U.S. Pat. No. 3,336,582. This patent also depicts the serial arrangement of different units and shows and describes specific signal sequences, gating and control circuits, as well as an entire set of tags, selection controls and commands that may be employed in the cooperation between a CPU and a control unit. A detailed enumeration of these signals or their sequences is not required, however, because only a limited number of request and response signals are germane to the present example.

As may be seen in FIG. 2, the multi-device control unit 17 is arranged to be cooperative with, or to be part of a pre-existing control unit. Although there are many different versions of I/O control units, as evidenced by U.S. Pat. Nos. 3,840,859, 3,909,795, 3,866,184 and the like, it is preferred to employ a unit such as the IBM 3830 Control Unit to illustrate the various control units depicted in FIG. 1.

The shared multi-device control unit 17 performs its usual functions, but a control unit in accordance with the invention additionally deals specifically with particular requests and responses as follows:

A. Channel initiative or Status Request signals from the CPU, usually designated as Start IO (SIO) or Test IO (TIO) signals in the IBM 3830 Control unit;

B. "Device busy" signals provided as channel responses from the control unit, and similarly designated in the IBM 3830;

C. "Control unit busy" signals provided as channel responses from the control unit, and also so designated in the IBM 3830;

D. Reconnection requests generated by the control unit and provided to the channel, these being designated "Request In" in the IBM 3830; and E. Channel acknowledgement or response signals to control unit requests for reconnection, typically termed "Select Out" signals in the IBM 3830.

In FIG. 2, an impasse detection and control circuit 40 is coupled into the input and output lines to the control unit 17. The inputs provided are the bus in lines 42, to the channel, those lines carrying the "device busy" and "control unit busy" signals, a status in line 44, an address out line 49 to indicate a channel selection, a select out line 46 for channel responses to control unit requests, and a request in line 48 for control unit requests. For IBM 370 channels TIO is encoded on bus out when a channel initiated connection occurs. A channel initiated selection is indicated by the concurrent presence of Select Out and Address Out. The only output provided is the control unit busy response, applied from the circuit 40, which may be coupled together with the internally generated control unit busy response from the control unit 17, at an OR circuit (not shown) for return to the channel. In effect, either the control unit 17 or the impasse detection and control circuit 40 may initiate the control unit busy response.

In the circuit 40, the bus in line 42 is coupled to a decoder 52 which responds with a signal only in response to the "device busy" code. This device busy signal is provided when the control unit responds to a channel selection sequence with status in and the device is busy. A request for status is implicit on every new channel selection. The signal from decoder 52 is applied with Status In, line 44 to an AND gate 54, the output of which is applied to the increment input of a predetermined counter 56. The counter is arranged to overflow and provide a signal indication at a selected overflow status, here a count of 64. Alternatively, however, a decoder (not shown) may be utilized to select any desired count setting for an output indication. In the event that the status in signal alone is provided, this means that the control unit 17 is not indicating "device busy". Consequently, the output of the AND gate 54 after passage through an inverter 58 will be "true", and the concurrent presence of a status in signal will activate an AND gate 60, the output of which resets the counter 56. The counter alternatively is reset by the occurrence of a Request In signal returned to a channel from the control unit 17 concurrently with a Select Out signal, as detected by an AND gate 62, the output of which represents a channel response to a control unit request for connection. This is applied through an OR circuit 64 to a reset input of the counter 56. The output of the counter 56 sets a bistable device such as a flip-flop 66, the corresponding output of which starts a timer circuit 68. The timer circuit 68 may comprise a counter operating in response to a free-running oscillator and having a decoder to select a predetermined output, or it may operate in response to a clock signal. In either event, an output is provided after a preselected interval to a reset input of the counter 56 through the OR circuit 64. The output of the flip-flop 66 represents the control unit busy response, and is derived through an output channel selection signal. Alternatively the inputs to the AND gate 70 may be arranged to provide the busy response only to the higher speed processor, so as to refuse further channel initiatives from the processor.

As to the operation of the arrangement of FIG. 2, it will be recalled that in FIG. 1 the first CPU 10 can have a significantly higher data rate than the second CPU 12. The CPUs are asynchronous, and with a data rate in the than in the second CPU 12, and impasse condition can arise in various ways. The first CPU 10 may be able to establish a queue of channel requests for different I/O devices, to scan through this queue, initiate whatever actions are required, and return to a given unit, such as the shared multi-device control unit 17, much more rapidly than can the slower second processor 12. That control unit 17, however, may retain a logical connection between a specific I/O device 22 and relative to the completion of a previously assigned task. This is sometimes referred to as an "interrupt", in control unit terminology, inasmuch as the control unit is required to indicate to the CPU that the previously dictated action has been completed. This does not constitute a departure from the slave mode, but merely an acknowledgement of the completion of the previously required action. In the control unit, however, a specific series of events must transpire in order for the control unit to be able to reconnect to the appropriate channel. The control unit must first repeatedly, as a part of its monitoring function, look for the performance of the assigned task, which is indicated by "device end" signals in the IBM 3830 terminology. The control unit then attempts to reconnect to the associated channel, providing a Request In signal, in response to which it receives an acknowledgment, designated Select Out, from the channel to enable the reconnection. Thereafter, the control unit, which concurrently indicates "control unit busy" to other channels, continues to work with the appropriate processor channel. This internal sequence of control functions is not suspended in the event that the control unit is unable to reconnect to the desired channel. Instead, if the control unit is unable to reconnect it must proceed as a slave unit to respond to other requests from its processor masters. If the faster processor continuously tries for a given I/O device before the reconnection has been made, and before the slower processor is finished its work with that I/O device, the only response which can be made is that the device is busy.

Consequently, if the faster processor repeatedly attempts to gain access to a given I/O device, it keeps the control unit occupied with device busy responses, and the control unit is effectively blocked from securing the needed reconnection to the slower processor. In this eventuality, a sequence of "device busy" signals is generated at the decoder 52, concurrently with the status in signals that are received on the line 44. Consequently, a succession of increment signals applied to the counter 56 causes the count to accumulate. If the sequence is broken, as by the provision of a Status In signal without a device busy response, then the counter 56 is reset through the AND gate 60. Alternatively, it may be reset through the AND gate 62 and the OR circuit 64 by a channel response to a control unit request, as evidenced by the combination of Select Out and Request In signals without Address Out. If the sequence remains unbroken, however, the counter overflows at the count of 64 (in this example) setting the flip-flop 66, and providing the control unit busy response, refusing further channel initiatives to all selected channels. The duration of this automatic refusal is determined by the timer 68, but typically need not be long, it being adequate generally if the timed interval encompasses a few operating cycles of the slower processor. At the end of this interval, the timer circuit provides the output signal which resets the counter 56, and also resets the flip-flop 66 and the timer 68 itself, enabling the impasse detection and control circuit 40 to repeat the operation if the impasse condition still exists. If a connection to the slower processor, requested by the control unit, occurs in the interval, the impasse detection counter and timer are also reset.

Methods in accordance with the invention thus are based upon monitoring of the responses of a control unit itself, for detection of the generation of an unbroken sequencer of busy indications of a particular type without the occurrence of a different action or response before a given value k is reached. In the event of such detection and independent initiative is undertaken for a specific limited period of time, T, generally sufficient to enable reconnection to an associated processor with which program steps are being undertaken. The independent initiative includes both completion of internal tasks and attempted reconnection to a requesting channel, if appropriate, together with concurrent provision of a busy signal to forestall intervening requests by the associated processors. The independent initiative does not extend beyond the limited interval, T, or after a reconnection is made so that after disruption of the impasse condition the control unit reverts to the slave relationship. If reconnection is not established the sequence of steps is repeated.

Although there have been described above and illustrated in the drawings various alternatives and modifications, it will be appreciated that the invention is not limited thereto but encompasses all variations within the scope of the appended claims.

What is claimed is:

1. In a system in which different asynchronous processors operate in conjunction with a shared control unit which in turn controls and monitors the status of more than one peripheral device, with the control unit responding to processor initiatives with indications of the status of peripheral devices and the control unit itself while also being required to reconnect to a processor for completion of a previously initiated sequence, but with the control unit normally functioning as a slave which may be required to respond repetitively to initiatives without being able to effect completion of a previously initiated action, such that an impasse condition can be reached in which needed action cannot be generated, the improvement comprising:

means for detecting an unbroken sequence of predetermined length of device busy response signals provided from said control unit;

means responsive to the detecting means for initiating a control unit busy signal such that the control unit independently initiates a busy indication to at least one of the processors, and timer means responsive to said detecting means and coupled to said initiating means to terminate said control unit busy signal after a predetermined limited interval, whereby said control unit can attempt for the interval to make a reconnection.

2. The invention as set forth in claim 1 above, wherein said detecting means comprises counter means, wherein said timer means resets said counter means, and wherein said system further includes means responsive to any other status signal than a device busy signal provided from said control unit for resetting said counter means.

3. The invention as set forth in claim 2 above, wherein said processors have different data rates, with one being substantially higher than the other, and further including decoder means coupled to said control unit for detecting each device busy signal occurrence.

4. In a system in which different asynchronous processors having different data rates are coupled by different channels to a shared control unit which functions as a slave in response to the processors, the control unit in turn being coupled to at least two peripheral units and being of the type of control unit which monitors the performance of actions by the peripheral devices and reconnects to the appropriate channel when a device has completed an assigned task so that the associated processor can direct the next sequential activity, but in which system the higher speed processor can generate requests at a sufficiently high rate for the peripheral device that only an indication can be returned that the device is busy, without time being permitted for the control unit while in the slave mode to reconnect to the appropriate channel for advancing to the next program step for a peripheral device, the improvement including a control circuit comprising:

means responsive to signals emanating from the control unit for detecting device busy indications;

counter means having an overflow condition at a predetermined count;

gating means responsive to the device busy signals and to status in signals provided by the control unit and coupled to increment the counter in response to busy signals, and to reset the counter when the status in signal is provided without a device busy signal;

output gating means coupling the counter overflow signals to at least one selected channel, such that a control unit busy response is automatically indicated on that channel;

and timer means responsive to the start of the overflow condition of the counter means and coupled to provide a reset signal to the counter means after a selected time interval.

5. The invention as set forth in claim 4 above, wherein said output gating means comprises bistable means responsive to the counter overflow and coupled to control said timer, and wherein said system further includes means coupling the output of said timer means to reset said bistable means and said timer means concurrently with said counter means.

6. The invention as set forth in claim 5 above, including means responsive to status request signals provided from the channel and acknowledgment signals returned to the channel for resetting said counter means, said bistable means and said timer means.

7. In a data processing system in which a control unit for a number of peripheral devices is shared between two or more processors having different data rates, and in which the control unit is required to monitor device status and request reconnection to a processor while also providing device busy and control unit busy responses as appropriate on a priority basis when queried by the processors, such that an impasse condition can arise in which the busy responses must be sent repetitively and forestall the needed reconnection, an impasse detection and control circuit comprising:

means including counter means coupled to the control unit and responsive to device busy signals therefrom for detecting an unbroken sequence of predetermined length of device busy signals;

means responsive to the detecting means and coupled to the control unit response lines to the processors for independently maintaining a control unit busy signal on the response lines for no greater than a predetermined duration; and means coupled to said control unit and responsive to the signals therefrom for terminating the independently maintained control unit busy signal upon establishment of reconnection of the control unit to a processor.

8. The invention as set forth in claim 7 above, wherein said means for independently maintaining a control unit busy signal includes timer means, and wherein said means for terminating the control unit busy signal includes means for resetting the counter means and the timer means.

9. A method for disrupting an impasse condition that may occur at a peripheral device control unit that is shared between at least two processors to which the control unit must respond in slave fashion and comprising the steps of:

monitoring the responses from the control unit to detect the occurrence of specific busy indications;

determining if the busy indications exceed a predetermined number without an interruption;

providing an independent control unit initiative for a selected limited interval when the predetermined number is exceeded;

concurrently attempting reconnection to processors which may be undertaking program steps with a peripheral device;

and repeating the cycle if a reconnection is needed but not made in the selected interval.

10. The method of claim 9 above, wherein the independent control unit initiative provides an indication that the control unit is busy to at least one of the processors.

11. A method for avoiding deadlock of one or more channels coupling data processors to a control unit that cooperates with at least two peripheral devices, wherein the control unit must respond to successive channel originated device status requests arriving at a high repetition rate and cannot service other channel or device interrupts, said method comprising the steps of:

counting runs r of "busy status" returns from the control unit to requesting channels, any "non-busy" status returns recommencing the count;

independently initiating a "control unit busy" status on at least one of the channels when the rth run exceeds a predetermined value k;

maintaining the "control unit busy" status for not more than a predetermined time T after initiation; and ascertaining the ready status of attached peripheral devices and attempting reconnection to a requesting channel paired to a ready device during the time T.

12. The method as set forth in claim 11 above, wherein the independently initiated "control unit busy" status is terminated when an attempted reconnection is made.

* * * * *